United States Patent [19]

Brothers

[11] 3,852,228

[45] Dec. 3, 1974

[54] THIXOTROPIC COATING COMPOSITION

[76] Inventor: Don R. Brothers, 3857 Fairway Dr., Canfield, Ohio

[22] Filed: Dec. 1, 1972

[21] Appl. No.: 311,265

Related U.S. Application Data

[63] Continuation-in-part of Ser. No. 104,455, Jan. 7, 1971, abandoned.

[52] U.S. Cl. .......... 260/23.7 M, 260/5, 260/23.7 B, 260/33.6 A
[51] Int. Cl.............................................. C08d 9/08
[58] Field of Search.............. 260/23.7 B, 33.6 A, 5, 260/23.7 M

[56] References Cited

UNITED STATES PATENTS

| | | | |
|---|---|---|---|
| 3,090,764 | 5/1963 | Ellis et al. | 260/33.6 |
| 3,338,849 | 8/1967 | Johnson | 260/5 |
| 3,400,090 | 9/1968 | Maslow | 260/23.7 |
| 3,402,220 | 9/1968 | Bierman et al. | 260/33.6 |
| 3,499,857 | 3/1970 | Searight et al. | 260/23.7 |
| 3,637,556 | 1/1972 | Brillinger | 260/23.7 |
| 3,644,240 | 2/1972 | Tarbell et al. | 260/33.6 |

OTHER PUBLICATIONS

Paint, Oil, and Colour Journal, Mar. 30, 1962, p. 796–798.

*Primary Examiner*—Donald E. Czaja
*Assistant Examiner*—E. C. Rzucidlo
*Attorney, Agent, or Firm*—Fay & Sharpe

[57] ABSTRACT

A thixotropic coating composition including butyl rubber and polybutene, an organic solvent, drying oils, a pigment and various minor additives are provided. Alternatively, rubber particles can be added to the foregoing composition, if desired.

13 Claims, No Drawings

THIXOTROPIC COATING COMPOSITION

This application is a continuation-in-part of U.S. patent application Ser. No. 104,455, filed Jan. 7, 1971 now abandoned.

BACKGROUND OF THE INVENTION

This invention is primarily concerned with a coating composition to be applied to the roof of a building, mobile home or camper trailer. However, the material can be adapted to coat walls or other surfaces for purposes of protection against heat, light or sound.

Mobile homes and trailers have for years had a special roof coating composition applied thereto which is intended to reflect heat as well as seal the roof against snow, rain and wind. The same is true with factory buildings. For the most part, this roof coating composition has an asphalt base and a typical batch of the same might be as follows (about a 500 gallon batch):

| Product | Quantity |
| --- | --- |
| Asphalt (Grade B) | 275 gallons |
| Asbestos Fibers (Grade 7-M) | 300 lbs. |
| Calcium carbonate filler | 500 lbs. |
| Aluminum paste | 900 lbs. |
| Silica-gel | 40 lbs. |
| Xylene | 80 gallons |

It happens that the aluminum paste is added for purposes of reflecting heat from the surface and as a matter of fact the aluminum paste is the most expensive component in the mixture. Unfortunately, the more asphalt that is added to keep the coating pliable, soft and easy to spread, the more aluminum paste is required to overcome the black color of the asphalt. Thus, the two main components of the coating (asphalt and aluminum paste) are working against each other.

Attempts have been made to lower the necessary amount of asphalt in the composition but when this happens the drying of the resulting coating is extremely fast and the coating quickly cracks with resultant failures of the necessary seal.

The need in the art is for a relatively quick drying roof coating composition which quickly achieves a relatively rigid crust at the top surface while remaining soft and pliable underneath. In this manner, the top crust will tend to be rigid and prevent flow while the soft, pliable undercoating will tend to flow and fill such cracks as do occur naturally over a period of time upon drying. It was conceived that a way to accomplish this objective was to substitute a mixture of butylene and butyl rubber for the asphalt. Butylene and butyl rubber dry much more slowly than asphalt and are thought to be relatively "non-drying" resins.

The term "butyl rubber" is intended to mean a copolymer of isobutylene plus a small percentage (usually about 1 to 3) of isoprene or a diene such as butadiene to provide sites for cross linking. These are the preferred components, however, the term butyl rubber could include in its broadest concept certain other diolefines. A product of the foregoing type is generally referred to as "uncured butyl rubber," whereas butyl rubber which has been heated at elevated temperatures to effect cross linking of the molecules thereof is generally referred to as "cured butyl rubber." In the practice of the invention, it is preferred to utilize either uncured or cured butyl rubber, depending on the desired properties of the resultant coating material, in the form or a 70% dispersion in mineral spirits.

BRIEF DESCRIPTION OF THE INVENTION

The resulting composition comprises a synthetic resinous mixture of butylene and butyl rubber, an organic solvent, a light and heat reflecting pigment, a drying oil and, if desired, particles of rubber. Clearly, the solvent is intended to thin the mixture and reduce the overall viscosity of the product allowing it to be spread evenly with a brush. The drying oil causes a crust to form on a surface exposed to air.

In the practice of this invention two commercially available pigments are often used. The purpose of their use is to have a light colored surface to reflect heat and/or light from the coated surface. One of the pigments used is an aluminum paste, commercially available for making standard aluminum paint. The other is a white powder including as its prime component titanium dioxide ($TiO_2$). However, other pigments such as iron oxide or cadmium selenide for red color, copper phthalocyanine for blue color, chrome green for green color, chrome yellow for yellow color and mixtures thereof may also be used for various physical and esthetic reasons.

The use of one pigment as opposed to the other is dictated more by the environmental conditions and the esthetic values of the owner of the facility being coated, than by the particular inherent properties of the pigments themselves. Aluminum paste is usually the preferred material suggested but other pigments are equally useful.

DETAILED DESCRIPTION OF THE PREFERRED EMBODIMENTS

The most important aspect of this invention is providing a thixotropic coating composition susceptible of use as a roof finishing material. This invention is primarily concerned with coatings for flat roofs, which coatings (1) form a hard water impervious crust at the exposed surface, (2) remain pliable underneath, (3) are applicable by a conventional paint brush or spraying apparatus, and (4) reflect heat and/or light from the surface. Following are examples of batches of material which serve these purposes and functions and include the physical properties necessary. (As noted, some formulations are set forth in gallons and pounds of the various constituents, whereas others are set forth on a percentage basis.)

EXAMPLE I

BATCH OF ALUMINUM COATING
(Brush Application)
Non-Sprayable

| Material | Liquid Fraction | Minimum | Preferred (About 202 gals.) | Maximum |
| --- | --- | --- | --- | --- |
| Gloss Oil (Glostol) see (a) below | Drying Oils | 0 | 55 gals. | 100 |
| Raw Linseed Oil | | 0 | 20 gals. | 100 |

-Continued

BATCH OF ALUMINUM COATING
(Brush Application)
Non-Sprayable

| Material | Minimum | Preferred (About 202 gals.) | Maximum |
|---|---|---|---|
| Liquid Fraction | | | |
| Combination of Glostol and raw linseed oil | 40 | 75 gals. | 100 |
| Butyl rubber (co-polymer of isobutylene + small % isoprene or a diene such as butadiene) | 10 | 15 gals. | 35 |
| Polybutene (butylene) | 10 | 15 gals. | 35 |
| Combination of butyl rubber and polybutene | 30 | 30 gals. | 60 |
| Xylol (xylene) | 10 | 25 gals. | 40 |
| Lecithin-N | 0 | 1.5 gals. | 5 |
| Syntex RL-80 see (b) below } Blending Agents | 0 | 0.5 gals. | 5 |
| Cobalt Drier | 0 | 1.5 gals. | 5 |
| Solid Fraction | | | |
| Aluminum Paste | 100 | 262 lbs. | 500 |
| Syloid AL-1 (silica-gel) | 2 | 20 lbs. | 50 |
| Rubber Fibers | 25 | 175 lbs. | 300 |
| Asbestos Fibers (Grade 7-M) | 25 | 150 lbs. | 300 |

(a) Trademark of Onyx Oil and Resin Corp.

EXAMPLE 2

BATCH OF ALUMINUM COLORED COATING
(Non-Sprayable)

| Material | Minimum | (In Wt %) Preferred | Maximum |
|---|---|---|---|
| Liquid Fraction | | | |
| Gloss Oil (Glostol) | 1 | 10 | 20 |
| Linseed Oil | 1 | 8 | 10 |
| Butyl Rubber (uncured)* | 3 | 12 | 15 |
| Polybutene (butylene) | 3 | 12 | 15 |
| Aromatic solvent (xylol) | 3 | 12 | 20 |
| Lecithin-N | 0 | 2 | 3 |
| Blending Agent (Syntex RL-80) (mixed esters) | 0 | 1 | 2 |
| Cobalt Drier | 0 | 1 | 2 |
| Aluminum Paste | 4 | 15 | 23 |
| Silica gel (Syloid AL-1) | 0.1 | 1 | 2 |
| Asbestos Fibers (Grade 7-M) | 1 | 12 | 20 |
| Rubber Buffings | 0 | 12 | 15 |

(b) Trademark of Celanese Corp.
* 70% dispersion in mineral spirits

The above formulation will yield a coating material that is heat and light resistant in addition to being weather resistant which is characterized by its metallic aluminum color.

EXAMPLE 3

BATCH OF ALUMINUM COLORED COATING
(Non-Sprayable)

| Material | Minimum | (In wt %) Preferred | Maximum |
|---|---|---|---|
| Liquid Fraction | | | |
| Gloss Oil | 1 | 8 | 20 |
| Linseed Oil | 1 | 8 | 10 |
| Butyl rubber (cured)* | 3 | 15 | 20 |
| Polybutene (butylene) | 3 | 10 | 15 |
| Aromatic solvent (xylol) | 3 | 12 | 20 |
| Lecithin-N | 0 | 3 | 3 |
| Blending Agent (Syntex RL-80) (Mixed esters) | 0 | 2 | 2 |
| Cobalt Drier | 0 | 1 | 2 |
| Solid Fraction | | | |
| Silica gel (Syloid AL-1) | 0.1 | 1 | 2 |
| Asbestos Fibers (Grade 7-M) | 1 | 14 | 20 |
| Rubber buffings | 0 | 11 | 15 |
| Aluminum Paste | 4 | 15 | 23 |

* 70% dispersion in mineral spirits

The above formulation will yield a coating material that is more abrasion resistant than that set forth in Example 2.

EXAMPLE 4

BATCH OF ALUMINUM COLORED COATING
(Sprayable)

| Material | Minimum | (In wt %) Preferred | Maximum |
|---|---|---|---|
| Gloss Oil | 1 | 10 | 20 |
| Linseed Oil | 1 | 8 | 10 |
| Butyl Rubber (uncured) | 3 | 10 | 15 |
| Polybutene (butylene) | 3 | 10 | 15 |
| Aromatic solvent (xylol) | 13 | 25 | 25 |
| Lecithin-N | 0 | 2 | 3 |
| Blending Agent (Syntex RL-80) (Mixed esters) | 0 | 1 | 2 |
| Cobalt Drier | 0 | 1 | 2 |
| Silica gel (Syloid AL-1) | 0.1 | 1 | 2 |
| $CaCO_3$ | 1 | 20 | 30 |
| Aluminum Paste | 4 | 12 | 23 |

As previously indicated, the prior art has used asphalt as the base material for roof coating compositions, but it has at least two defects. The first is that it is black and it takes a substantial amount of aluminum paste to overcome the black color and give the proper light reflectance by the pigment. Second, it drys rather quickly becoming hard and susceptible to cracking and chipping. This invention has substituted a mixture of butyl rubber and polybutylene (or polybutene) for the asphalt.

Polybutene and butyl rubber are known to be non-hardening or non-drying resins and as such will tend to remain soft and pliable for a longer period of time than the conventional asphalt. However, the key to the whole coating composition is to get the butyl rubber and polybutene in mixed liquid form and to cause the exposed surface of the coating to dry quickly to serve as a barrier against additional drying.

When it is desired to apply a sprayable composition produced according to the teaching of the invention on a surface, care should be taken to use a butyl rubber composition which does not form cobwebs during the spraying operation. The desired results can be achieved by using uncured butyl rubber material which is in the form of a 70% dispersion in mineral spirits.

Raw linseed oil and gloss oil (for example, Glostol, a commercial drying oil well known in the paint industry comprising approximately 30 –40% mineral spirits and 60-70% solids with the solids being refined tall oil consisting of approximately 50% rosin acids and 50% fatty acids) are interchangeable in the combination with the resin mixture. Both serve as surface drying oils which form a crust on the surface but it is preferred that some raw linseed oil be included in the mixture as it gives better penetration and adhesion properties to the butyl rubber. Linseed oil is more expensive than gloss oil (Glostol) and thus a minimum amount of linseed oil is used where possible. The preferred gloss or caulk oil is marketed by Onyx Oil and Resins of New York City under the trade designation Glostol HV.

Xylene or xylol is the preferred resin solvent although other aromatic solvents could be used in certain circumstances. Xylene is known to be a strong solvent and in addition it helps bring out the brillance of the aluminum pigment added to the mixture. It serves as a thinner to reduce the viscosity of the product and allows the pigment to float to the top surface.

The lecithin-N is preferably a product of soybean oil (the N standing for natural) which is a smoothing and wetting agent which helps the other products blend together and minimizes stratifying of the components upon long standing in storage.

Syntex RL–80 is a well known smoothing and blending product in the paint industry and it serves the same essential function as lecithin-N. Syntex RL–80 is a composition which comprises mixed esters that contain small amounts of lead.

A conventional 6% cobalt drier well known in the paint industry is used to accelerate surface drying of the coating and helps to form the initial crust at the exposed surface to prevent drying throughout the coating and to help insure the soft, pliable undersurface. Generally, the drier comprises 6% cobalt metal by weight in the form of a cobalt salt of naphthenic acids dissolved in mineral spirits.

The butyl rubber is relatively non-drying and its prime purpose is to keep the undersurface pliable. As beforementioned, when it is desired to apply the composition of the instant invention by spraying, it is preferred to use an uncured butyl rubber material which is in the form of a 70% dispersion in mineral spirits.

Polybutene is a relatively non-drying resin and serves essentially the same purpose in this context as butyl rubber. However, the polybutene has the additional property of being an extremely good adhesive for the coating and helps the coating to adhere tenaciously to a roofing surface. The preferred polybutene is a medium viscosity resin. Greater amounts of polybutene might be added if a lower viscosity resin were used. In practice, it is preferred to use polybutene having a molecular weight ranging from about 50,000 to 100,000.

Commercially available aluminum paste is used in amounts necessary. However, the commercially available aluminum paste reacts with water to form a gas. Where enough water is available in a can of aluminum paint of aluminum roof coating composition such as this invention uses, it will tend to form enough gas to blow off the top of a conventional paint can. (The fact is $H_2$ is formed from the paste-water reaction but this is immaterial to the invention). For this reason, a small amount of silica-gel is added to the composition.

There is a direct relationship between the amount of aluminum paste and the silica-gel and as low as 1% or lower could be used. That is, theoretically, the ratio of silica-gel to aluminum paste could be as low as 1 to 100. However, the fibers added in the mixture change this slightly. Fibers inherently absorb moisture thus, where fibers are added, more silica-gel must be added to pick up this moisture.

Rubber particles in the form of rubber fibers (as hereinafter described) or rubber buffings (also, as hereinafter described) may be added to the thixotropic coating composition of the invention to produce a material having certain unique physical properties.

For example, rubber fibers are added to the mixture to give body and resilience to the coating to help minimize the cracking which will occur with drying over a period of time. The rubber fibers in this particular product are purchased commercially from tire manufacturers who have shredded old automobile tires and preferably the fibers are about ⅜ × 1/16 × 1/16 inch. Specifically, there is a need for fibers as opposed to chips or powdered rubber in certain instances. The rubber fibers as well as the asbestos fibers to some extent, will serve to minimize cracks in the drying mixture. This composition is a thixotropic mixture and with all thixotropic mixtures the product is weak in shear. Traditional thixotropic mixtures used as coatings lie on a surface and look to the naked eye to be hard and rigid or at least jelly-like in consistency. However, upon vibration or placing the coating in shear, the coating will flow almost like water. When the mechanical forces are abated, the thixotropic mixture will again set up, somewhat in the consistency of a viscous jelly and with a hard surface crust in some cases. In the instant invention, the expansible rubber fibers are well mixed throughout the coating to give body and minimize gross movement from vibrations. When over a long period of time the hard crust begins to crack the expansible rubber fibers may bridge the crack or gap and as the rubber is imbedded in each side of the crack, it will tend to expand as the gap widens until such time as the force exerted by the rubber strand exceeds the shear strength of the thixotropic coating at which time the mixture will flow and fill the gap again, to some extent. Thus, the cracks which occur naturally will not extend to the bottom of the coating. In fact, when a small crack begins a hard crust will form in the gully as the drying oil is exposed to the drying atmosphere. Thus, the crack will not extend completely through the coating and the weather seal will not be impaired.

As with the rubber fibers, the asbestos fibers give body to the mixture and make the product light and fluffy while absorbing some of the liquid of the mixture. The absorbing factor makes a good bond between the fibers and the other constituents. As previously stated, one of the prime reasons for the aluminum color is to reflect heat. The asbestos fibers help to insulate the surface as well as provide cohesion.

The "rubber fibers" referred to in this disclosure denote that material cut from the tread area of automobile tires in the preparation of the tire body for recapping. The scrap "rubber" is purchased in bulk from tire recappers, and screened to get useful sizes. No other limitation on the source of rubber fibers is necessary although there may be other useful materials. So long as the "rubber" fibers are elastic and resistant to the included solvents they may be used successfully.

The term "rubber buffings" as used herein means particulate vulcanized rubber obtained from buffing or abrading rubber products such as flashings from molded rubber goods and those obtained during the preparation of rubber surfaces for acceptance of laminations such as buffing old tire carcasses for recapping. This fine particle material serves as a filler which increases flexibility and relieves stresses.

It should be stated that certain other drying oils than Glostol HV (gloss oil) and linseed oil will be obvious to one having ordinary skill in the art and then may be equally useful.

However, the two drying oils used are preferred because they are relatively inexpensive and easily available in the market place.

When properly prepared the resulting composition or mixture, while still in the can appears to be extremely stiff and looking somewhat like dry textured paint. However, upon dipping a paint brush into the can, it readily adheres to the brush and is easily brushed on the surface to be coated. There are numerous ways of applying paints or coatings to a surface, however, it is extremely important in this field of endeavor to be able to brush the coating on the surface. The market place for this particular product is in the do-it-yourself area, small manufacturers of trailers and mobile homes or single factory building roof coating. Since this is the case, the workman applying the coating will not be expected to have sophisticated apparatus for applying coatings. Thus, it is extremely important that the brushability of the product be maintained.

It should be noted that upon brushing the coating on a surface, any fibers in the mixture which may be present tend to give the surface a textured appearance. As is well known in the heat transfer and sound-proofing industries, there is a direct relationship between the amount of sound and heat transferred and the surface area exposed. The fibrous, textured appearance increases the exposed surface area and thus inherently increases the heat reflectance and the sound absorption. Additionally, a soft resilient barrier will absorb more sound than a rigid barrier. Thus, not only are the fibers important for body and minimizing cracks in such a coating, but they also provide a mechanism for increasing the exposed surface area to thereby increase heat reflectance and reduce the noise factor.

A different thixotropic coating composition is within this invention which is white as opposed to silver colored. Proportional limits on such a composition are as follows:

EXAMPLE 5

BATCH OF WHITE COATING

| Liquid Fraction Material | Minimum | Preferred | Maximum |
|---|---|---|---|
| Gloss Oil | 0 | 55 gals. | 100 |
| Raw Linseed Oil | 0 | 20 gals. | 100 |
| Combination of above drying oils | 40 | 75 gals. | 100 |
| Butyl Rubber | 10 | 15 gals. | 35 |
| Polybutene | 10 | 15 gals. | 35 |
| Combination of Butyl Rubber and polybutene | 30 | 30 gals. | 60 |
| Naphtha | 15 | 35 gals. | 50 |
| Lecithin-N | 0 | 1.5 gals. | 5 |
| Syntex RL-80 | 0 | 1.5 gals. | 5 |
| Cobalt Drier | 0 | 0.5 gals. | 5 |
| Solid Fraction | | | |
| White Pigment — $TiO_2$ | 200 | 400 lbs. | 800 |
| Rubber Fibers (white) | 0 | 50 lbs. | 300 |
| Asbestos Fibers (Grade 7-M) | 25 | 200 lbs. | 300 |

In addition, various multichromatic coating compositions may be produced as set forth in the following additional Examples.

EXAMPLE 6

BATCH OF RED COLORED COATING MATERIAL
(Non-Sprayable)

| Liquid Fraction Material | Minimum | (In wt %) Preferred | Maximum |
|---|---|---|---|
| Gloss Oil | 1 | 10 | 20 |
| Linseed Oil | 1 | 8 | 10 |
| Butyl Rubber (uncured) | 3 | 12 | 15 |
| Polybutene (butylene) | 3 | 12 | 15 |
| Aromatic Solvent (xylol) | 3 | 12 | 20 |
| Lecithin-N | 0 | 2 | 3 |
| Blending Agent (Syntex RL-80) (Mixed esters) | 0 | 1 | 2 |
| Cobalt Drier | 0 | 1 | 2 |
| Solid Fraction | | | |
| Silica gel (Syloid AL-1) | 0.1 | 1 | 2 |
| Asbestos Fibers (Grade 7-M) | 1 | 14 | 20 |
| Rubber buffings | 0 | 7 | 15 |
| Iron Oxide | 4 | 20 | 23 |

EXAMPLE 7

Same as Example 6, with the iron oxide replaced by copper phthalocyanine for blue color.

EXAMPLE 8

Same as Example 6, with the iron oxide replaced by chrome green for green color.

EXAMPLE 9

Same as Example 6 with the iron oxide replaced by chrome yellow for yellow color.

EXAMPLE 10

Same as Example 6, with the iron oxide replaced by titanium dioxide for a white color.

It will be noted that the proportions of resin, drying oil, lecithin-N, cobalt drier, Syntex RL–80 and asbestos fibers are about the same. Thus, no additional comment appears necessary on these components.

It should be noted that white rubber fibers are preferably used in the white coating. Experimentally, it was determined that black rubber fibers are hard to shield with the pigment (TiO$_2$). "White rubber fibers" as used herein are made from the scrap of rubber goods manufacturers which is probably clay and whiting and would have some titanium dioxide and zinc oxide added. The composition is not as important as the elasticity.

While the discussion herein has concerned, in the main, compositions which contain rubber fibers, it should be noted here that when it is desired to apply the composition of the invention by spraying, it is preferred not to include such rubber fibers.

In a typical sprayable composition the basic ingredients are: butylene and butyl rubber, an organic solvent, drying oil and a pigment. Optionally, asbestos fibers and other ingredients such as blending agents, dries for the drying oils and desiccants may be included in the final composition.

Preferred drying oils are linseed oil and gloss oil, a commercial drying oil comprising about 30% to 40% mineral spirits and 60 to 70% solids with the solids being refined tall oil consisting of approximately 50% rosin acids and 50% fatty acids.

The preferred resinous materials consist of polybutylene and uncured butyl rubber which is used in the form of a 70% dispersion in mineral spirits.

The preferred solvent is one which dissolves the resinous material and does not adversely react with the various components found in the composition of the invention. Xylol has been found to be an excellent solvent when the composition of the invention contains an aluminum base pigment. Likewise, naphtha and mineral spirits have also been used as effective solvents.

The specific pigment used in the composition of the invention depends to a great degree on the intended end use of the resultant material. To reflect light and heat, aluminum and titanium dioxide pigments have been utilized. Whereas, to accomplish varied final artistic effects, colored pigments, as beforementioned, have been employed. Again, all that is required is that pigment perform its desired function and that it does not deleteriously react with the various components of the resultant composition.

As before noted, if it is desired to remove water from the composition, a suitable material such as silica gel can be added to the composition of the invention.

Also, to effect or control the rate at which the drying oils autoxidize, i.e., dry, various conventional dries can be employed, such as a 6% cobalt dissolved in mineral spirits. However, it should be noted here that other conventional driers may also be employed in this version of the practice of the invention.

In addition, to insure the proper blending of the various components of the composition of the invention various well known blending agents may be employed. Generally, these blending agents are of the type commonly utilized in the paint industry, such as lecithin and the like.

If desired, asbestos fibers can be included in the composition of the invention. However, if this composition is to be applied by spraying, care must be taken to avoid the presence of large particles.

Certain modifications and changes in the components of the preferred embodiments will be obvious to those having ordinary skill in the art for example, substitution of mineral spirits for naphtha would be obvious. Accordingly, the applicant does not intend to be bound by the particular terminology used in describing this invention, rather he intends to be bound only by the scope and spirit of the appended claims.

What is claimed is:

1. A sprayable thixotropic coating composition comprising:

a. about 3 to about 15 weight percent of butyl rubber;

b. about 3 to about 15 weight percent polybutene, said polybutene having a molecular weight of at least about 50,000;

c. about 2 to about 30 weight percent drying oil;

d. about 13 to about 25 weight percent aromatic solvent, e. about 4 to about 23 weight percent of pigment; and f. up to about 2 weight percent of a drier.

2. The thixotropic coating composition of claim 1 wherein:

said drying oil is selected from the group consisting of gloss oil, linseed oil and mixtures thereof.

3. The thixotropic coating composition of claim 1 wherein:

said aromatic solvent xylol.

4. The thixotropic coating composition of claim 1 wherein:

said butyl rubber is cured.

5. The thixotropic coating composition of claim 1 wherein:

said butyl rubber is uncured.

6. The thixotropic coating composition of claim 1 which includes particulate rubber material selected from the group consisting of rubber fibers, rubber buffings and mixtures thereof.

7. The thixotropic coating composition of claim 1 wherein the molecular weight of polybutene ranges from about 50,000 to about 100,000.

8. The thixotropic coating composition of claim 1 wherein said pigment is selected from the group consisting of aluminum paste, iron oxide, copper phthalocyanine, chrome green, chrome yellow, titanium dioxide, and mixtures thereof.

9. The thixotropic coating composition of claim 8 which includes silica gel.

10. The thixotropic coating composition of claim 1 which includes a cobalt dryer.

11. The thixotropic coating composition of claim 1 which includes lecithin.

12. The thixotropic coating composition of claim 1 which includes a mixture of esters containing minor amounts of lead.

13. A brushable thixotropic coating composition comprising:

a. from about 3 to about 15 weight percent butyl rubber;
b. about 3 to about 15 weight percent polybutene, said polybutene having a molecular weight of at least about 50,000;
c. about 2 to about 30 weight percent drying oil;
d. about 3 to about 20 weight percent aromatic solvent;
e. about 4 to about 23 weight percent of pigment; and
f. up to about 2 weight percent of a drier.

* * * * *